United States Patent [19]

Odom

[11] Patent Number: 5,374,823
[45] Date of Patent: Dec. 20, 1994

[54] PULSED NEUTRON DECAY TOOL FOR MEASURING GAMMA RADIATION ENERGY SPECTRA FOR FAST NEUTRON INELASTIC COLLISIONS AND THERMAL NEUTRON CAPTURE EVENTS

[75] Inventor: Richard C. Odom, Benbrook, Tex.

[73] Assignee: Computalog U.S.A., Inc., Fort Worth, Tex.

[21] Appl. No.: 144,304

[22] Filed: Oct. 28, 1993

[51] Int. Cl.$^5$ .............................................. G01V 5/10
[52] U.S. Cl. ............................ 250/269.6; 250/269.1
[58] Field of Search ................ 250/270, 269, 266, 256

[56] References Cited

U.S. PATENT DOCUMENTS

| | | |
|---|---|---|
| 3,164,720 | 1/1965 | Armistead . |
| 4,122,338 | 10/1978 | Smith et al. . |
| 4,326,129 | 4/1982 | Neufeld . |
| 4,390,783 | 1/1983 | Grau .................................... 250/270 |
| 4,424,444 | 1/1984 | Smith et al. . |
| 4,712,007 | 12/1987 | Ondrik . |
| 4,721,853 | 1/1988 | Wraight . |
| 4,947,040 | 8/1990 | Mahdavi et al. . |
| 5,128,541 | 7/1992 | Mahdavi et al. . |

OTHER PUBLICATIONS

Gamma Radiation From Inelastic Scattering of 14–Mev Neutrons by the Common Earth Elements, Richard Caldwell, et al., Nuclear Science and Engineering (1960), pp. 173–182.

The Gamma Spectrometer Tool Inelastic and Capture Gamma-Ray Spectroscopy For Reservoir Analysis, Peter Westaway, et al., Society of Petroleum Engineers AIME, Sep. 1980, pp. 1–16.

The Continuous Carbon/Oxygen Log-Basic Concepts and Recent Field Experiences, Hopkinson, et al., Journal of Petroleum Technology, Oct. 1982, pp. 2441–2448.

Response Characterization of an Induced Gamma Spectrometry Tool Using a Bismuth Germanate Scintillator, Jacobson, et al., 32nd Annual SPWLA Logging Symposium, 1991, Midland, Tex.

A New Compensated Through-Tubing Carbon/Oxygen Tool For Use In Flowing Wells, Scott, et al., SPWLA 32nd Annual Logging Symposium, Jun. 16–19, 1991.

Continuous Carbon/Oxygen Log Interpretation Techniques, Lawrence, Journal of Petroleum Technology, Aug. 1981, pp. 1394–1402.

Advances in Carbon/Oxygen Logs Clarify Reservoir Behind Casing, Wyatt, Jr., Oil & Gas Journal, Feb. 1993, pp. 54–61.

Quantitative Use of Computer Models in Calibration of the Computalog Pulsed Neutron Thermal Decay Tool (PND), Odom, et al., SPWLA 33rd Annual Logging Symposium, Jun. 14–17, 1992.

*Primary Examiner*—Paul M. Dzierzynski
*Assistant Examiner*—Richard Hanig
*Attorney, Agent, or Firm*—Mark W. Handley; Andrew J. Dillon

[57] ABSTRACT

A well logging tool in accordance with the present invention is provided for emitting neutron bursts, and determining inelastic energy spectra and thermal neutron capture cross sections during a single logging pass over a well depth interval. Inelastic energy spectra are determined, in part, by measuring exponential decay rates for thermal neutrons capture events that occur during decay periods which extend for at least several thermal neutron lifetimes following each of the neutron bursts, and by using the measured exponential decay rates to project from thermal neutron capture spectra detected during the decay periods a value for thermal neutron capture components of the total energy spectra detected during neutron burst periods.

32 Claims, 9 Drawing Sheets

PULSED NEUTRON DECAY TOOL FOR MEASURING GAMMA RADIATION ENERGY SPECTRA FOR FAST NEUTRON INELASTIC COLLISIONS AND THERMAL NEUTRON CAPTURE EVENTS

BACKGROUND OF THE INVENTION

1. Technical Field of the Invention

This invention relates to well logging tools for emitting a series of neutron bursts into a formation and detecting gamma radiation emitted by the formation in response to the neutron bursts, and in particular, to a well logging tool for measuring inelastic energy spectra of the resultant gamma radiation.

2. Description of the Prior Art

Prior art well logging tools have been used for emitting pulses of fast neutrons and detecting a resultant gamma radiation from a formation. Fast neutrons are generated in pulses, or bursts, of neutron emissions and typically have an initial energy level of 14 MeV. The detected resultant gamma radiation is utilized to determine various formation parameters, such as porosity, lithology, water saturation, and hydrocarbon saturation.

These prior art well logging tools are typically operated in either a sigma logging mode or a spectroscopy logging mode. Prior art well logging tools which are operated in the sigma logging mode have been used during the last thirty years for logging wells to determine thermal neutron capture cross sections, or sigma, for formations. During the last twenty years, prior art well logging tools which are operated in the spectroscopy logging mode have been developed for measuring inelastic energy spectra for the gamma rays which are emitted as a result of inelastic collisions between the fast neutrons and formation nuclei.

The inelastic energy spectra measured during a spectroscopy logging mode contain signature energy peaks which may be processed to determine the relative amounts of particular types of nuclei included within a formation. For example, when nuclei of carbon and oxygen are impacted by fast neutrons having energy levels which range from 5 MeV to 14 MeV, or greater, gamma radiation having gamma rays at discrete energy levels are emitted as a result of the impacts, or collisions. These discrete energy levels of emitted gamma rays are different for nuclei of carbon than for nuclei of oxygen, providing signature peaks in the detected energy spectra for a formation interval.

Prior art logging tool detectors have been used for measuring inelastic spectra to determine the relative amounts of these discrete energy levels from gamma radiation energy spectrum data samples. Although these discrete energy levels are "smeared" together by compton scattering and the response characteristics of logging tool detector means, they still may be used to provide characteristics of the formation, such as, for example, a Carbon/Oxygen ratio, or "C/O" ratio. Other ratios may also be determined. These ratios may then be used for determining formation parameters, such as distinguishing tight formations from gas, oil from fresh water, and determining lithology.

Prior art well logging tools typically determine an inelastic energy spectrum by taking a total gamma ray energy spectrum data sample during a series of neutron bursts, and then deducting a thermal neutron capture energy spectrum from the total gamma ray energy spectrum. The thermal neutron capture energy spectrum is determined by detecting thermal neutron capture energy spectral counts during the decay periods following the neutron bursts, and then, in some instances, multiplying these spectral counts by a fixed scaling factor. This method for determining the thermal neutron capture energy spectrum is less accurate than if a gamma ray energy decay rate were to be determined for the decay periods of the data sample and used for determining the capture component of the gamma ray energy spectrum.

These prior art well logging tools, when operable in both spectroscopy and sigma logging modes, are operated in only one mode during a single logging pass, since different tool firing cycles are required to obtain an optimum statistical quality for data samples. This requires that at least two logging passes be run in order to obtain measurements for both neutron capture cross sections and inelastic energy spectra having a desired statistical quality.

Further, spectroscopy logging modes for tool operating cycles of prior art well logging tools include firing cycles which have decay periods which do not extend for several lifetimes of thermal neutrons within a formation. This results in data samples which are less accurate for determining thermal neutron decay rates during prior art spectroscopy logging modes than if the decay periods were extended for several lifetimes, as some prior are well logging tools do when operated in a capture operating mode.

Additionally, tool operating cycles for operating prior art well logging tools in spectroscopy logging modes generally include firing cycles having short neutron burst durations, as compared to some prior art well logging tools when operated in sigma mode. A longer spectroscopy mode neutron burst duration allows for more accurate measurement of inelastic energy spectra.

SUMMARY OF THE INVENTION

It is therefore one object of the present invention to provide a well logging tool for emitting bursts of fast neutrons and determining inelastic energy spectra for gamma radiation induced in response to inelastic collisions between the fast neutrons and formation nuclei, wherein the inelastic energy spectrum are determined by subtracting from a total gamma ray energy spectrum detected during the neutron bursts a burst thermal neutron capture energy spectra determined by projecting a measured exponential decay rate curve from thermal neutron capture gamma ray energy spectra detected in decay periods following the neutron bursts.

It is another object of the present invention to provide a well logging tool for emitting bursts of fast neutrons and determining inelastic energy spectra for gamma radiation induced in response to inelastic collisions between the fast neutrons and formation nuclei, the well logging tool having a tool timing cycle in which a decay period extends after each burst of fast neutrons for at least several lifetimes of the thermal neutrons to provide adequate time for measuring an exponential thermal neutron decay rate from gamma radiation emitted by the formation in response to thermal neutron capture.

It is yet another object of the present invention to provide a well logging tool for emitting bursts of fast neutrons and detecting gamma radiation induced in response to interaction of the fast neutrons with a formation, the well logging tool having a dual logging mode in which the duration of the bursts of fast neutrons is varied between a spectroscopy logging mode and a sigma logging mode for detecting inelastic energy spectra and determining thermal neutron capture cross sections during a single logging pass over a well depth interval.

A well logging tool is provided in accordance with the present invention for emitting neutron bursts, and determining inelastic energy spectra and thermal neutron capture cross sections during a single logging pass over a well depth interval. Inelastic energy spectra are determined, in part, by measuring exponential decay rates for thermal neutron capture events which occur during decay periods extending for at least several thermal neutron lifetimes following each of the neutron bursts, and by using the measured exponential decay rates to project from thermal neutron capture spectra detected during the decay periods a value for thermal neutron capture components of the total energy spectra detected during neutron burst periods.

The well logging tool of the preferred embodiment of the present invention detects gamma radiation induced an response to interaction of the neutron bursts with earth formations. The well logging tool is operable in a dual logging mode having a tool timing cycle in which the duration of the neutron bursts is varied between a spectroscopy logging mode and a sigma logging mode for detecting inelastic energy spectra and thermal neutron capture cross section, respectively, during a single logging pass over a well depth interval.

When the well logging tool of the preferred embodiment of the present invention is operated in the spectroscopy logging mode, inelastic energy spectra are determined by subtracting from a total gamma ray energy spectrum detected during the neutron bursts a burst thermal neutron capture energy spectrum. The burst thermal neutron capture energy spectra are determined by projecting, into the burst measurement time frame, a measured exponential thermal neutron decay rate curve from thermal neutron capture gamma ray energy spectra detected in decay periods following the neutron bursts. Further, the preferred tool timing cycle for the spectroscopy logging mode includes a decay period which extends after each burst of fast neutrons for at least several lifetimes of the thermal neutrons to provide adequate time for measuring the exponential thermal neutron decay rate of gamma radiation emitted by the formation in response to thermal neutron capture.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
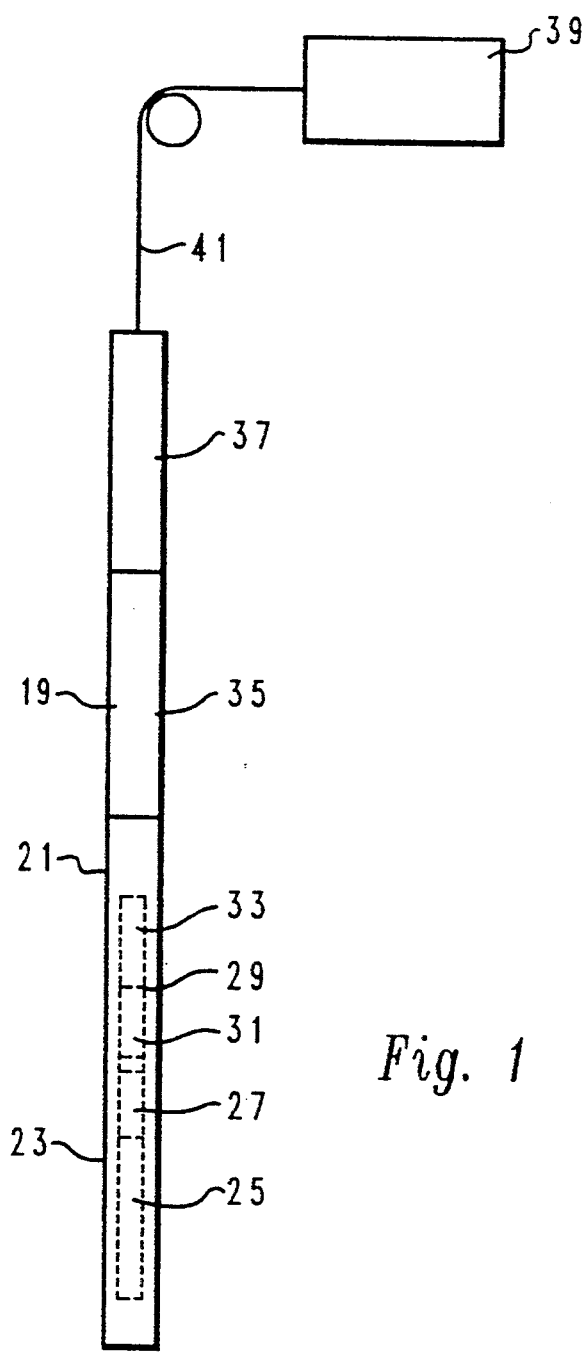
FIG. 1 is an elevational view which schematically depicts the well logging tool of the preferred embodiment of the present invention.

Referring to FIG. 1, an elevational view schematically depicts well logging tool 19 of the preferred embodiment of the present invention. Well logging tool 19 includes housing 21 within which various tool components are included for operating within wells. Well logging tool 19 includes sonde 23. Sonde 23 includes pulsed neutron source 25, radiation shield 27, and gamma ray detector 29. Gamma ray detector 29 includes scintillation crystal 31 and photo-multiplier tube 33. In the preferred embodiment of the present invention, pulsed neutron source 25 is a prior art particle accelerator for creating pulses of fourteen MeV neutrons. Further, in the preferred embodiment of the present invention, gamma ray detector 29 is a prior art detector in which the scintillation crystal is formed from sodium-iodide which is doped with thallium. Photomultiplier tube 33 is a prior art high count rate photomultiplier tube.

Well logging tool 19 further includes downhole hardware 35, sonde controller 37, and surface computer 39. Surface computer 39 is connected to the downhole portion of well logging tool 19 by wireline 41. Downhole hardware 35 provides counter hardware for operation of well logging tool 19, and sonde controller 37 provides downhole control for operation of well logging tool 19.

Figure 2:
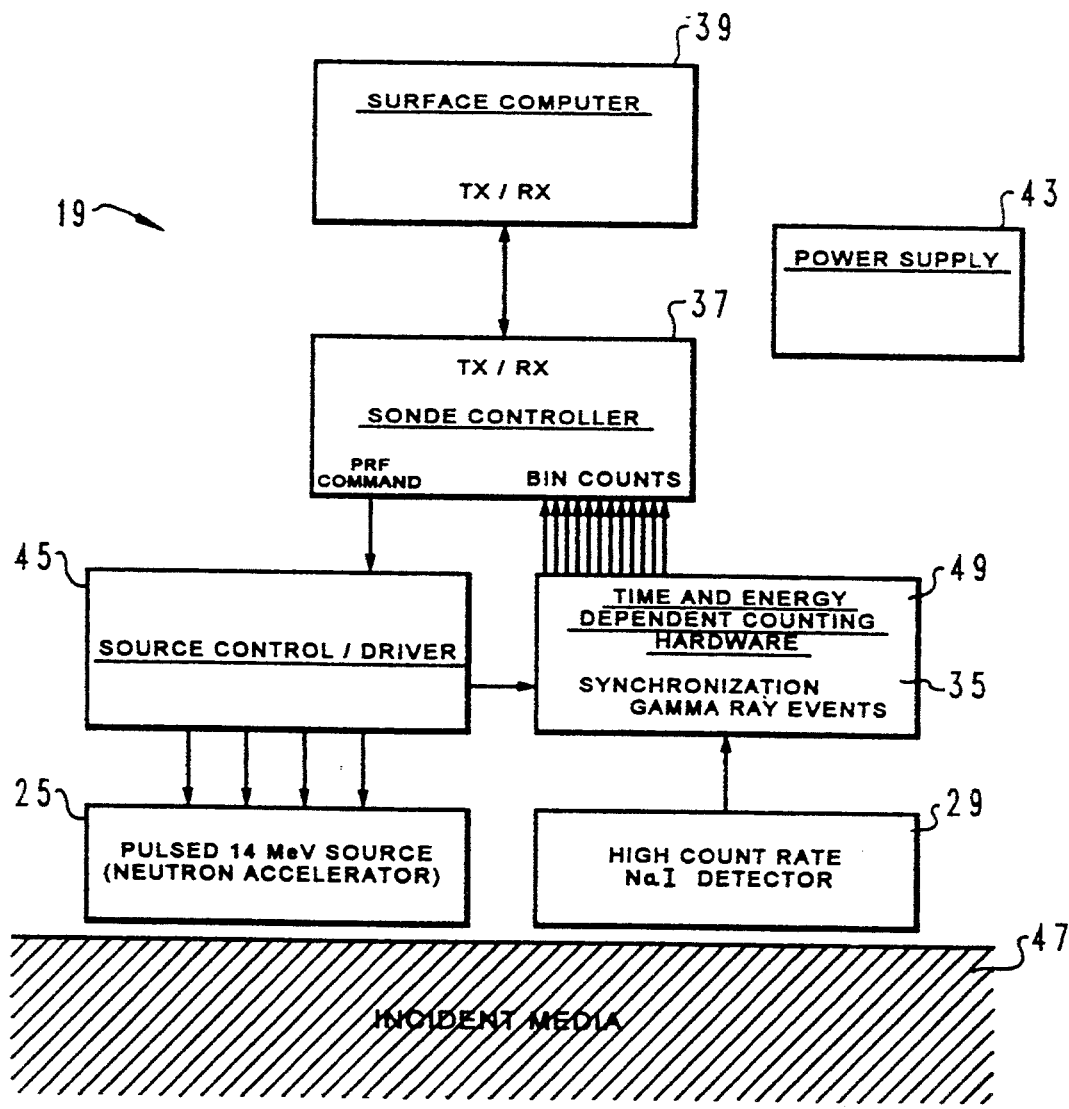
FIG. 2 is a block diagram which schematically depicts hardware for the well logging tool of the preferred embodiment of the present invention.

With reference to FIG. 2, a block diagram schematically depicts well logging tool 19 of the preferred embodiment of the present invention. Power supply 43 powers well logging tool 19. Sonde controller 37 controls downhole operation of well logging tool 19, in conjunction with surface computer 39. During operation of logging tool 19, controller 37 sends a pulse to source control/driver 45 to cause neutron source 25 to emit a burst of fast neutrons, having an energy level of 14 MeV. The burst of neutrons interacts with nuclei within incident media 47, which include both the borehole and adjoining formation, to induce emission of gamma radiation. This emitted gamma radiation is caused by activation of nuclei, inelastic collisions between neutrons having energy levels ranging from 5 to 14 MeV and above with nuclei, and capture of thermal neutrons by nuclei.

Detector 29 detects gamma radiation and emits an output data signal, or pulse, having a voltage which is proportional to the energy level of particular gamma rays of the gamma radiation detected. Gamma ray detector then emits the gamma ray pulses to downhole hardware which includes counting hardware 49. A discriminator and data storage bins are provided by counting hardware 49.

The discriminator and counting hardware 49 receive output data signals from detector 29, and sort these output signals according to output voltage values for storing as counts in the different data storage bins over time. Since the output voltage values for the output signals from detector 29 are proportional to the energy of gamma radiation detected, counts above a certain minimum energy level are output in at least one of five spectral energy channels. Each separate spectral energy channel passes detected counts into a specific data storage bin within counting hardware 49. Counts are therein accumulated for storage over several firing cycles to provide a data sample.

Surface computer 39 periodically signals controller 37 to output a data sample from counting hardware 49 for passing uphole for processing within surface computer 39. Once a data sample is passed uphole, computer 39 serves as a processor for processing the data and outputting processed data which includes certain formation parameters. Output data includes parameters which can be further processed to indicate formation properties such as porosity, water saturation, and hydrocarbon saturation.

Figure 3:
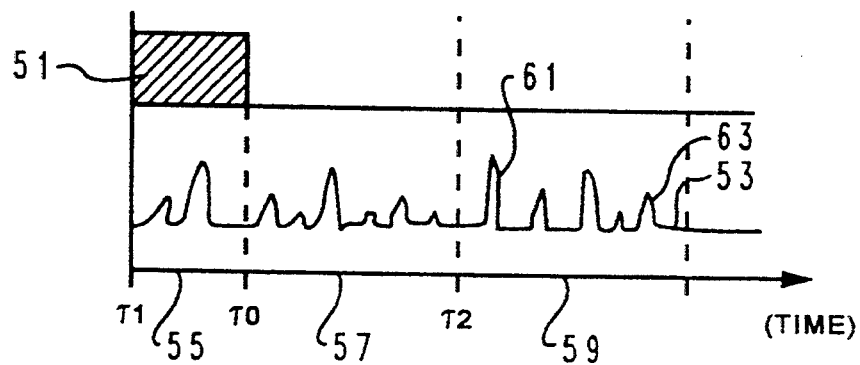
FIG. 3 is timing diagram depicting operation of the well logging tool of the preferred embodiment of the present invention in a spectroscopy logging mode firing cycle to illustrate the sequence for emitting a neutron burst and detecting gamma radiation emitted in response to inelastic and capture events resulting from the neutron burst.

Referring now to FIG. 3, a timing diagram schematically depicts operation of well logging tool 19 in a spectroscopy logging mode firing cycle to illustrate the sequence for emitting a neutron burst and detecting gamma radiation emitted in response to inelastic collisions and capture events resulting from the neutron burst. Neutron burst 51 occurs, emitting fast neutrons into a borehole and formation. Output data signal 53 is passed from detector 29 to downhole hardware 35 (shown in FIG. 2). Burst time period 55 occurs during neutron burst 51, between $T_1$ and $T_0$. Then follows intermediate time period 57 between $T_0$ and $T_2$. Lastly follows capture time period 59, after $T_2$. During burst time period 55, gamma radiation is detected which results from a mixture of both inelastic and capture events. After intermediate time period 57, gamma radiation emitted in response to thermal neutron capture events predominates. Within time period 59, high energy output data signal 61 is shown which represents detection of a high energy gamma ray photon. Low energy output data signal 63 is shown which represents detection of a lower energy gamma ray photon. Output data signal 53 is processed by counting hardware 49 (shown in FIG. 2) to determine which spectral channel, during a measurement time frame, output data signal 53 will be passed through for storing in the data storage bins of counting hardware 49 (shown in FIG. 2).

Figure 4:
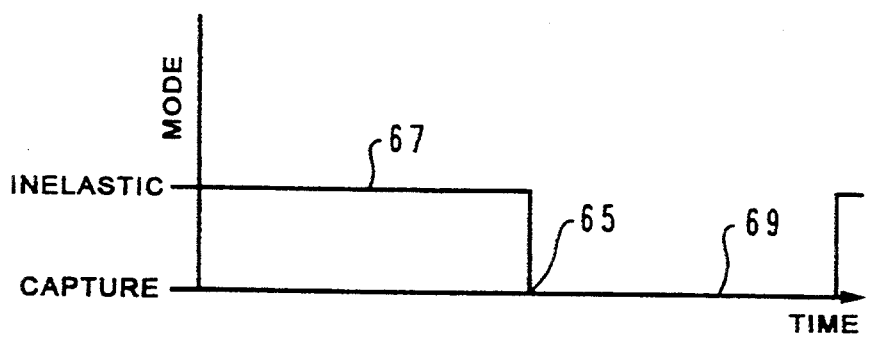
FIG. 4 is a timing diagram depicting operation of the well logging tool of the preferred embodiment of the present invention over a tool operating cycle.

With reference to FIG. 4, a timing diagram depicts operation of well logging tool 19 over tool operating cycle 65. Tool operating cycle 65 includes a spectroscopy logging mode period 67, and sigma logging mode period 69. During spectroscopy logging mode period 67, a data sample is accumulated by measuring gamma radiation which occurs in response to a number of neutron bursts. The number of neutron bursts typically depends on when surface computer 39 (shown in FIG. 2) instructs controller 37 (shown in FIG. 2) to pass a data sample uphole. Typically, in the spectroscopy logging mode, a data sample may be accumulated from gamma rays emitted in response to around 500 neutron bursts.

During sigma logging mode period 69, typically around 200 to 500 neutron bursts will occur in collecting a data sample for passing uphole. In the preferred embodiment of the present invention, a value for sigma ($\Sigma$) is determined by measuring the decay rate tau ($\tau$), in microseconds ($\mu$sec), for a well depth interval, and then dividing the value for tau ($\tau$), in microseconds, into 4550 to determine the value for sigma ($\Sigma$) in capture units (c.u.).

Figure 5:
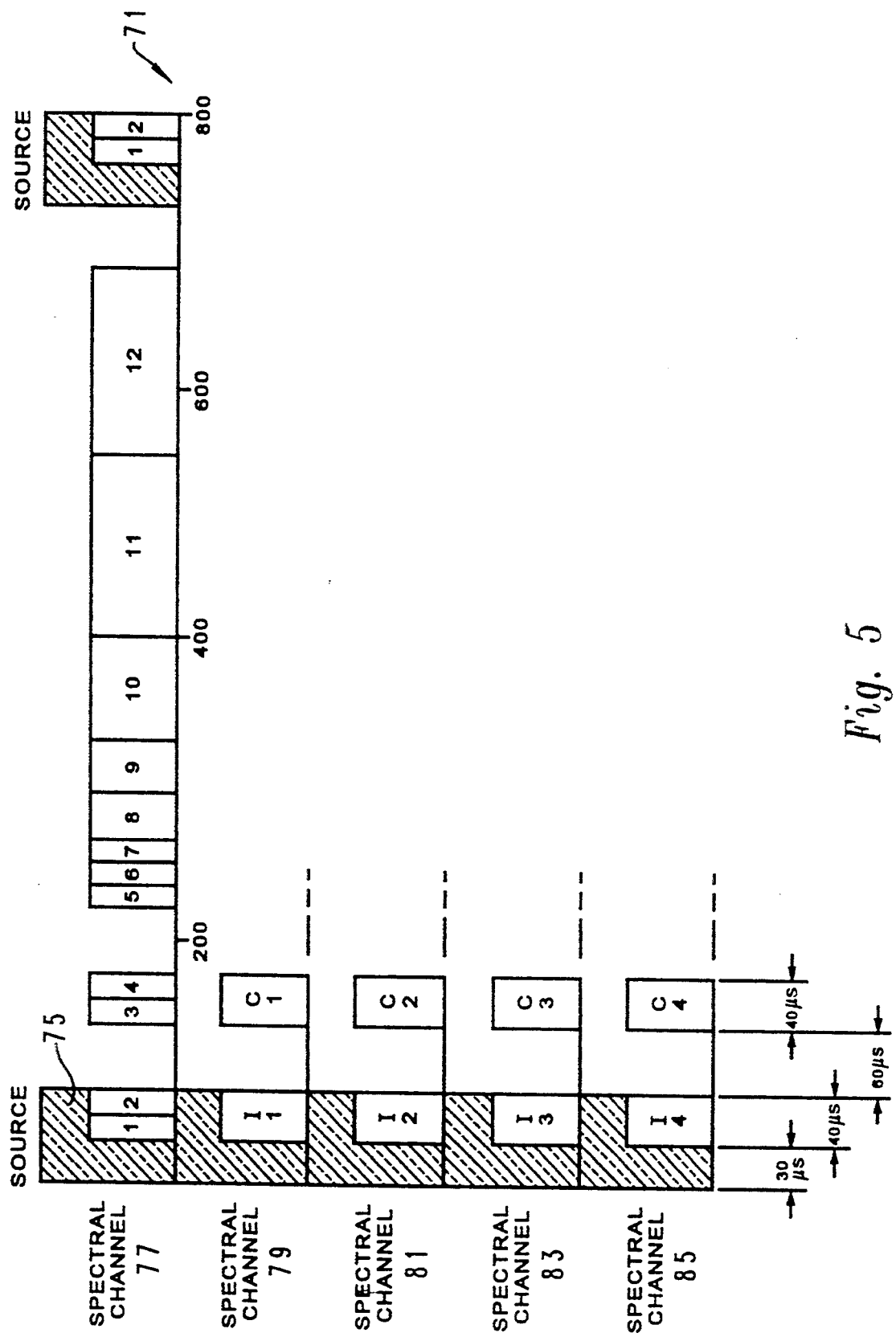
FIG. 5 is a timing diagram which depicts sequencing of gamma ray spectral energy channel counts into particular data storage bins during a spectroscopy firing cycle, during which the well logging tool of the preferred embodiment of the present invention is operated in the spectroscopy logging mode.

Referring to FIG. 5, a timing diagram depicts sequencing of gamma ray spectral channel energy counts into particular data storage bins during spectroscopy neutron burst firing cycle 71 when the well logging tool of the preferred embodiment of the present invention is operated in the spectroscopy logging mode. Data is sorted into five spectral channels, spectral channel 77, spectral channel 79, spectral channel 81, spectral channel 83 and spectral channel 85. Spectral channel 77 passes counts which represents gamma ray photons having an energy above 105 KeV, for indicating a total number of, or bulk, thermal neutron capture events.

In general, well logging tool 19 of the preferred embodiment of the present invention will not quantify counts for gamma radiation having energy levels of 8 MeV and above. Spectral channel 79 passes counts which represent gamma ray photons having an energy level between 1.6 and 2.4 MeV, and the number of counts representing inelastic events is an indicator of the amount of silica in a formation. Spectral channel 81 passes counts which represent gamma ray photons having an energy level ranging from 2.4 to 3.4 MeV, of which the number of counts from inelastic events is representative of the amount of calcium in formation. Spectral channel 83 passes counts representing gamma ray photons having an energy level ranging from 3.4 to 4.5 MeV, and the number of counts representing inelastic events is indicative of the amount of carbon in a formation. Spectral channel 85 passes counts which represent detected gamma ray photons having energy levels ranging from 4.5 to 8 MeV, and the number of counts from inelastic events is representative of the amount of oxygen in a formation.

Combinations of the ratios of the number of counts accumulated in data storage bins after passing through the different spectral channels can be analyzed for determining different formation parameters. For example, the number of counts accumulated in a sample after passing through spectral channel 83 into a specific data storage bin, such as data storage bin I3, can be divided by the number of counts accumulated in a data sample after passing through spectral channel 85 and into data storage bin I4 to determine a carbon/oxygen ratio, abbreviated as "C/O ratio".

Schematically depicted in FIG. 5, data storage bins 1 through 12 are utilized over various time intervals for accumulating counts which pass through spectral channel 77. Bins 1 and 2 store counts which are accumulated during initial neutron burst 75. Bins I1 and C1 store counts accumulated during the time intervals as shown. Data storage bins I1, I2, I3, and I4 are utilized for accumulating a total gamma ray energy spectrum detected during a spectroscopy logging mode period of a tool operating cycle. Bins C1, C2, C3, and C4 accumulate counts for determining a thermal neutron capture gamma ray energy spectrum detected during a plurality of decay periods which provide a sample collected during a spectroscopy logging mode period of the tool operating cycle. Bins 1 through 12, which collect counts from spectral channel 77 over different times, are provided for determining a thermal neutron capture event gamma ray decay rate, as is discussed below.

Table A, listed below, identifies the data storage time intervals for sequencing gamma ray spectral channel counts into particular data storage bins during spectroscopy firing cycle 71 of the spectroscopy logging mode depicted in FIG. 5.

TABLE A

| BIN # | STARTS @ | WIDTH |
| --- | --- | --- |
| 1 | 30 μS | 20 μS |
| 2 | 50 μS | 20 μS |
| 3 | TAU + 60 μS | 20 μS |
| 4 | TAU + 80 μS | 20 μS |
| 5 | 3.00 * TAU | 0.31 * TAU |
| 6 | 3.31 * TAU | 0.25 * TAU |
| 7 | 3.56 * TAU | 0.25 * TAU |
| 8 | 3.81 * TAU | 0.50 * TAU |
| 9 | 4.31 * TAU | 0.50 * TAU |
| 10 | 4.81 * TAU | 1.00 * TAU |
| 11 | 5.81 * TAU | 2.00 * TAU |
| 12 | 7.81 * TAU | 2.00 * TAU |
| I1 | 30 μS | 40 μS |
| C1 | TAU + 60 μS | 40 μS |
| I2 | 30 μS | 40 μS |
| C2 | TAU + 60 μS | 40 μS |
| I3 | 30 μS | 40 μS |
| C3 | TAU + 60 μS | 40 μS |
| I4 | 30 μS | 40 μS |
| C4 | TAU + 60 μS | 40 μS |

Note: TAU = 70 microseconds (μsec)

It should be noted that during the spectroscopy logging mode, in which spectroscopy burst firing cycle 71 is utilized, the value for tau ($\tau$) is held at a constant value of 70 microseconds. The first column indicates a particular data storage bin alphanumeric identifier. The second column indicates the time between the beginning of an initial neutron burst and the beginning of sequencing counts into the indicated bin. The third column indicates the time interval over which counts are sequenced into a particular data storage bin.

Figure 6:
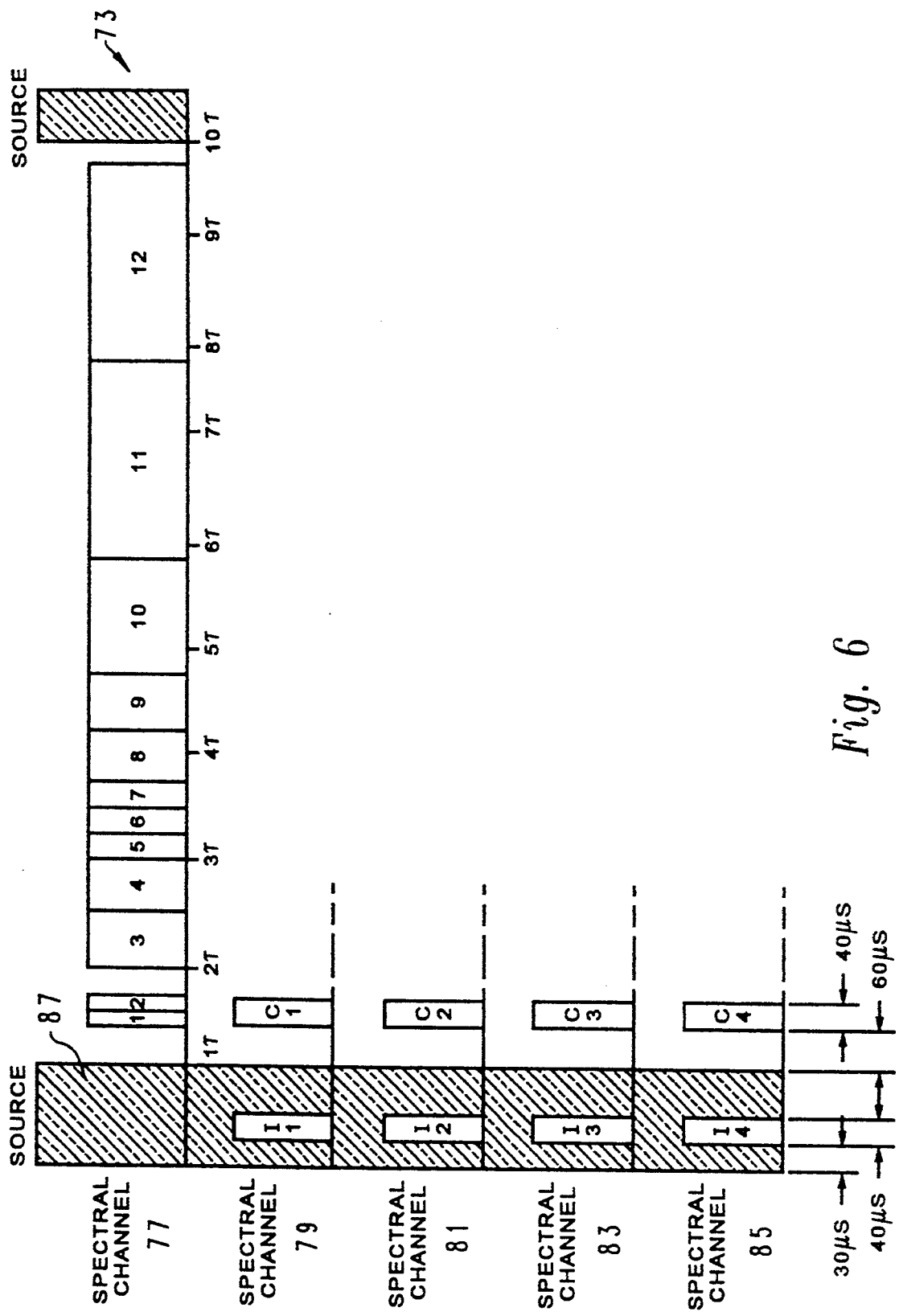
FIG. 6 is a timing diagram which depicts sequencing of gamma ray spectral energy channel counts into particular data storage bins during a sigma firing cycle, during which the well logging tool of the preferred embodiment of the present invention is operated in the sigma logging mode.

Referring now to FIG. 6, a timing diagram depicts sequencing of gamma ray spectral energy channel counts into particular data storage bins during sigma firing cycle 73 when the well logging tool 19 is operated in the sigma logging mode. Operation of well logging tool 19 in the sigma logging mode for sequencing data storage counts from spectral channels 77, 79, 81, 83 and 85 into the appropriate data storage bins occurs as discussed for the spectroscopy logging mode, except that timing for the different events is changed. In the sigma logging mode, tau ($\tau$) from the previous sigma logging mode data sample is utilized for controlling the data storage time intervals. Currently, in the preferred embodiment of the present invention, only spectral channels 1 through 12 are utilized for determining formation parameters in the sigma logging mode.

Table B, listed below, identifies the data storage time intervals for sequencing gamma ray spectral channel counts into particular data storage bins during sigma firing cycle 73 of the sigma logging mode depicted in FIG. 6. It should be noted that during the sigma logging mode, in which sigma firing cycle 73 is utilized, the first column indicates the bin numeric identifier. The second column indicates the time between the beginning of an initial neutron burst and the beginning of sequencing counts into the indicated bin. The third column indicates the width or time interval over which counts are sequenced into the particular data storage bin.

TABLE B

| BIN # | STARTS @ | WIDTH |
| --- | --- | --- |
| 1 | TAU + 60 μS | 20 μS |
| 2 | TAU + 80 μS | 20 μS |
| 3 | 2.00 * TAU | 0.5 * TAU |
| 4 | 2.50 * TAU | 0.5 * TAU |
| 5 | 3.00 * TAU | 0.31 * TAU |
| 6 | 3.31 * TAU | 0.25 * TAU |
| 7 | 3.56 * TAU | 0.25 * TAU |
| 8 | 3.81 * TAU | 0.50 * TAU |
| 9 | 4.31 * TAU | 0.50 * TAU |
| 10 | 4.81 * TAU | 1.00 * TAU |
| 11 | 5.81 * TAU | 2.00 * TAU |
| 12 | 7.81 * TAU | 2.00 * TAU |
| I1 | 30 μS | 40 μS |
| C1 | TAU + 60 μS | 40 μS |
| I2 | 30 μS | 40 μS |
| C2 | TAU + 60 μS | 40 μS |
| I3 | 30 μS | 40 μS |
| C3 | TAU + 60 μS | 40 μS |
| I4 | 30 μS | 40 μS |
| C4 | TAU + 60 μS | 40 μS |

Note: TAU typically ranges from 100 to 500 microseconds (μsec)

Figure 7:
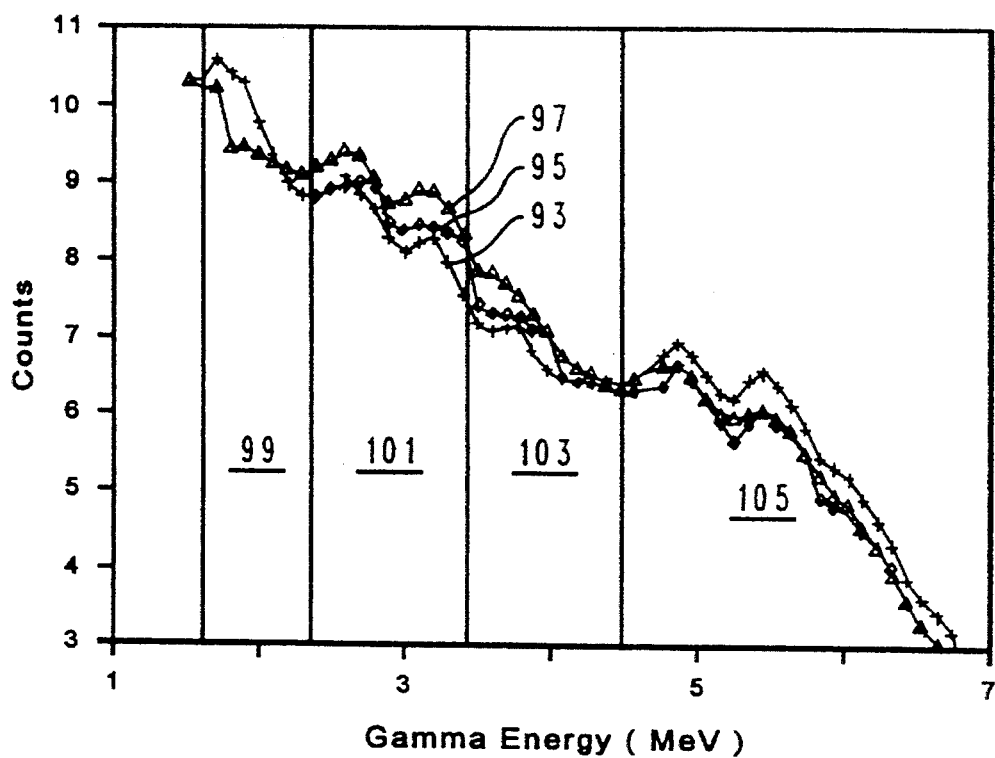
FIG. 7 is an illustrative diagram depicting hypothetical inelastic energy spectra for gamma radiation detected by the well logging tool of the preferred embodiment of the present invention.

Referring now to FIG. 7, an illustrative diagram depicts hypothetical inelastic energy spectra for gamma radiation detected by well logging tool 19. The inelastic energy spectra includes three separate spectrums, spectrum 93 which is representative of a saltwater sand, spectrum 95 which is representative of an oil sand, and spectrum 97 which is representative of a freshwater limestone formation.

First segment 99 of the inelastic spectra represents total counts occurring over an energy range which corresponds to spectral channel 79, which would be accumulated in data storage bin I1. Second segment 101 represents the total counts occurring during a data sample from spectral channel 81, which would be accumulated in data storage bin I2. Third section 103 represents the total number of counts occurring in a data sample from spectral channel 83, which would be accumulated in data storage bin I3. And lastly, fourth segment 105 of the inelastic spectrum represents the total number of counts detected over an energy range which is representative of spectral channel 85, which would be accumulated in data storage bin I4.

Figure 8:
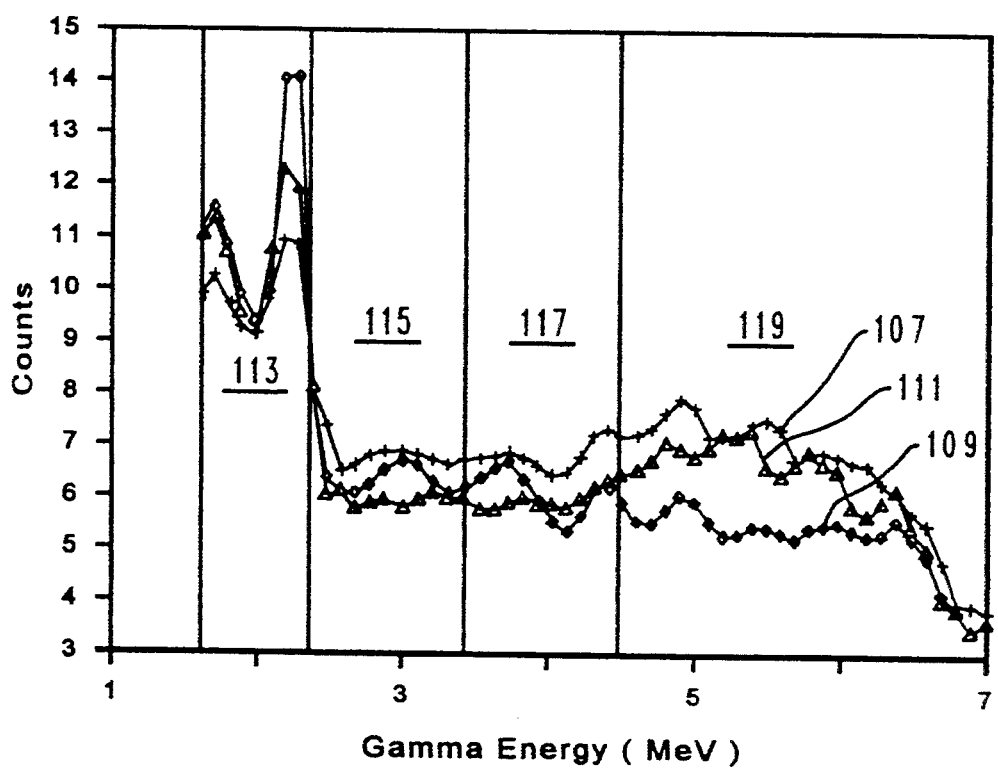
FIG. 8 is an illustrative diagram depicting hypothetical thermal neutron capture energy spectra for gamma radiation detected by the well logging tool of the preferred embodiment of the present invention.

With reference to FIG. 8, an illustrative diagram depicts hypothetical thermal neutron capture energy spectra for gamma radiation detected by well logging tool 19 of the preferred embodiment of the present invention. The inelastic energy spectra include three separate spectra, spectrum 107 which is representative of a saltwater sand, spectrum 109 which is representative of an oil sand, and spectrum 111 which is representative of a freshwater limestone formation. The different spectral energy channels are represented by different segments of the capture spectrum. Counts accumulated over segment 113 of the capture spectrum from spectral channel 79 would be accumulated within bin C1 during a sigma logging mode period of a tool cycle. Accordingly, counts occurring within segment 115 would pass through spectral channel 81 and accumulate in data storage bin C2. Counts plotting within segment 117 pass through spectral channel 83 and accumulate in data storage bin C3. Counts occurring within segment 119 pass through spectral channel 85 and accumulate in data storage bin C4.

It should be noted that FIGS. 7 and 8 depict hypothetical inelastic energy spectrum and hypothetical capture energy spectra. The resolution depicted for the spectra in FIGS. 7 and 8 is for illustrating the spectra which different types of formations would emit. These are hypothetical spectra for a logging tool response from a 1-inch sodium-iodide detector run in 7-inch casing which is cemented within a 10-inch borehole. In actual operation, well logging tool 19 of the preferred embodiment of the present invention would accumulate only a total count rate for each of the spectral channels in data storage bins, and not the much greater resolution as depicted in FIGS. 7 and 8. The spectra detected for FIGS. 7 and 8 would be the number of counts occurring over an energy range corresponding to each of the different segments depicted within each of the different sectors of the FIGS. 7 and 8.

Figure 9:
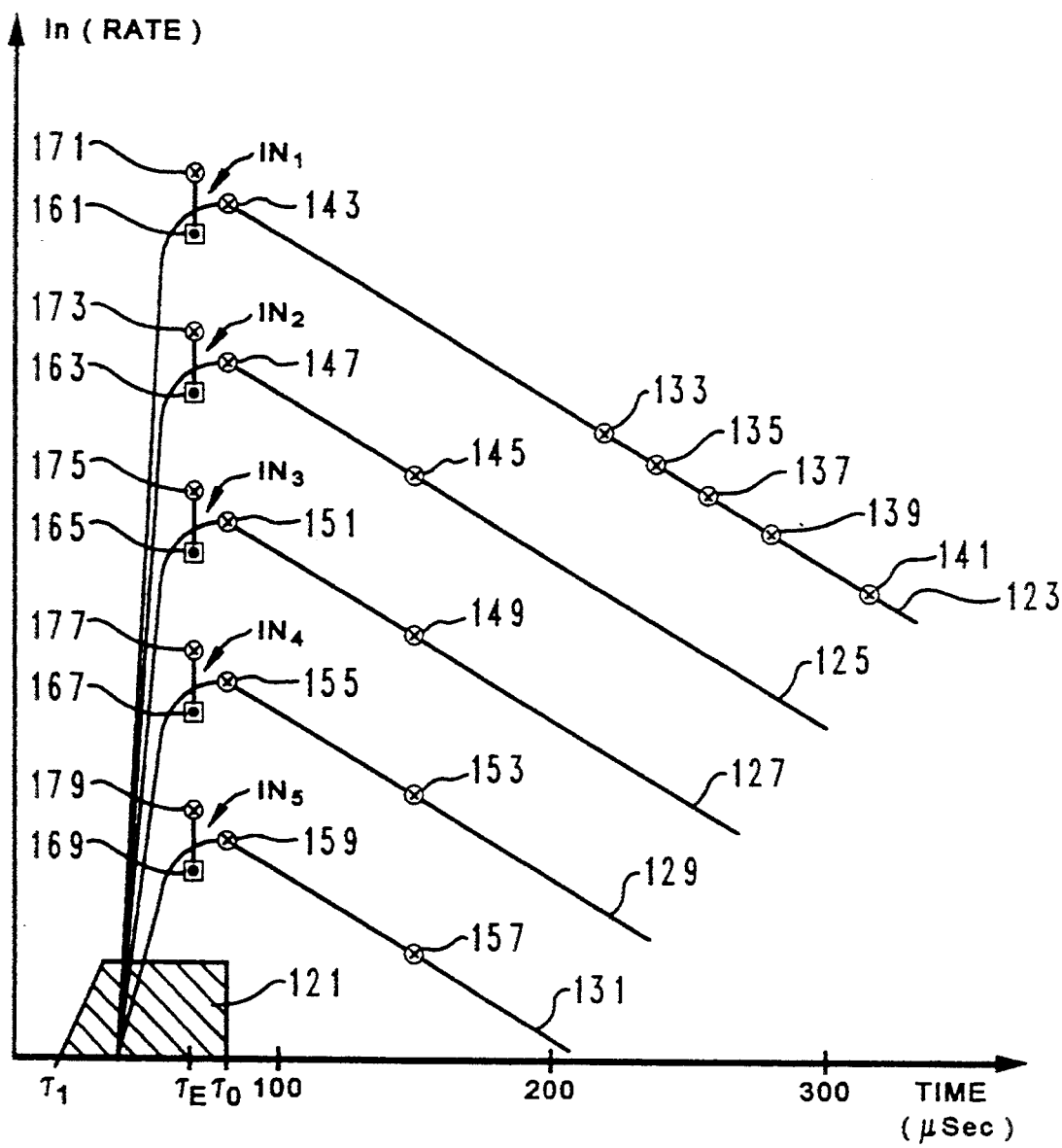
FIG. 9 is a synchronization diagram which graphically depicts a preferred method of the present invention for processing a data sample collected during the spectroscopy logging mode and determining the inelastic component of the energy spectrum detected during the burst periods.

Referring now to FIG. 9, a synchronization diagram graphically depicts a preferred method of the present invention for processing a data sample measured during a spectroscopy logging mode period. The synchronization diagram schematically displays the rate of buildup and decay of spectral emissions for a data sample in relation to the timing of the various firing cycle burst and decay periods of the spectroscopy logging mode period over which the data sample is collected. As discussed above, a data sample is actually collected over a plurality of firing cycles, and not over a singular firing cycle. A data sample for the spectroscopy logging mode is typically collected over approximately 500 firing cycles.

In the synchronization diagram of FIG. 9, the natural logarithms of count rates for the data sample are plotted against effective rate times, in microseconds, for sequencing counts into the various data storage bins according to the spectroscopy logging mode firing cycle depicted in FIG. 5. This correlates, or synchronizes, the counts collected in various data storage bins with the neutron bursts and decay periods of the different firing cycles of the spectroscopy logging mode period within which the data sample is collected. The portion of the synchronization diagram which corresponds to the burst periods is depicted by neutron burst 121.

Count rates are determined from each of the various data storage bins by dividing the total number of counts for each bin by the duration, or length of time, for which gamma ray counts are collected within the bin. An effective rate time is assigned to the count rate for each bin of a data sample. The term effective rate time is herein defined as the time during the spectroscopy logging mode firing cycle at which a count rate for a particular bin is assigned to occur. In the preferred method of FIG. 9, the count rates for each bin are assigned to occur at the median point of the total number of counts for each bin, that is, at a time at which half of the total counts for each bin have occurred. In other embodiments of the present invention, alternative rate times may be assigned.

A decay equation representing an exponential decay of count rates during the decay periods is fitted to count rates and effective rate times for the data sample. In the preferred embodiment of the present invention, the equation chosen for representing an exponential decay of count rates provides a linear plot when the natural logarithm of count rates are plotted against time, as shown in FIG. 9.

The rate times for the count rates for each bin are determined using the decay equation for an exponential decay of count rates over time, and the actual decay rate, or tau ($\tau$), determined from a previous data sample. It should be noted that although the gating, or timing, does not change for sequencing counts into the various data storage bins during the spectroscopy logging mode, the rate times are still determined for each data sample since the decay rate, or the value of tau ($\tau$) used in the decay equation, determines the shape of the count rate decay curve for the data sample, and thus determines when half of the counts would be stored in each bin during a firing cycle for the data sample. Thus, the rate times change with the decay rate, which is determined by the value of tau ($\tau$) used in the exponential decay rate equation.

Still referring to FIG. 9, the count rates calculated for data storage bins 5 through 9, of FIG. 5 and Table A, are plotted against the rate times determined for each bin to provide data points 133, 135, 137, 139, and 141, respectively. The decay equation representing an exponential rate of decay in gamma radiation count rates over time is then fitted to data points 133, 135, 137, 139 and 141, from first spectral energy channel 77, to provide curve 123. Curve 123 represents the decay rate over time for detected gamma radiation which would be passed through the first spectral channel 77.

The capture count rates at a specific time, for each spectral energy channel, are presumed to be a function of the neutron population at that specific time. According to this presumption, the capture count rates for each spectral energy channel are presumed to be a function of the declining neutron population during the decay periods after the neutron bursts. As the neutron population declines, according to the above presumption, the count rates corresponding to different energy levels of gamma radiation will also decline at the same rate as the neutron population. The rate of decay of all of the spectral energy channels are presumed to be parallel functions of the same neutron population at any given moment. Thus, the rate of decay for one spectral channel during a particular data sample is presumed to be the same rate of decay for the other spectral energy channels, during that particular data sample.

Referring still to FIG. 9, in the preferred embodiment of the present invention, curve 123 represents the rate of decay of spectral energy channel 77. Curve 123 is determined by fitting an exponential equation to data points 133, 135, 137, 139, and 141. Since the rate of decay is presumed to be the same for all spectral energy channels, curves 125, 127, 129, and 131 are taken to be parallel to curve 123, which are all determined by parallel functions of the declining neutron population for the data sample.

Data points 145, 149, 153, and 157 represent the count rates and effective rate times for data storage bins C1, C2, C3, and C4, respectively. The slope of curve 123, which represents the rate of decay of the declining neutron population over time, is used to project through data points 145, 149, 153, and 157, from the other spectral energy channels, to determine curves 125, 127, 129, and 131, which extend parallel to curve 123. Curves 125, 127, 129, and 131 represent the rate of decay of the spectral energy channels 79, 81, 83, and 85, respectively.

After determining the slope of curve 123, curve 123 is projected from data points representing the counts collected in bins 3 and 4 to the end of neutron burst 121 to determine data point 143, which represents the rate of thermal neutron capture gamma radiation occurring at the end of neutron burst 121, at time $T_0$. Then curve 125, having the slope of curve 123, is projected through data point 145 to determine data point 147. Data point 147 represents the count rate of thermal neutron capture gamma radiation which is occurring at time $T_0$, at the end of neutron burst 121, and which has an energy level which ranges from 1.6 MeV to 2.4 MeV. This procedure is repeated to project curve 127 from data point 149 to time $T_0$ and determine data point 151, to project curve 129 from data point 153 to time $T_0$ and determine data point 155, and to project curve 131 data point 157 to time $T_0$ and determine data point 159.

Once the count rates for thermal neutron capture gamma radiation occurring at the end of neutron burst 121 are determined for each spectral energy channel, the count rates attributable to the capture component for the total number of counts accumulated in each of data storage bins 1 and 2, I1, I2, I3 and I4 are determined by solving for integrals of an exponential buildup equation, which represents an exponential rate of buildup during neutron bursts 121, using count rates 143, 147, 151, 155, and 159 to represent the final count rate at the end of the bursts.

The exponential buildup equation is solved to determine a rate for the capture component for each spectral channel, for each of data storage bins 1 and 2, I1, I2, I3 and I4. The integrals for the buildup equation are solved using tau ($\tau$) calculated for the data sample and including one of the points 143, 147, 151, 155, and 159 which each correspond to a particular spectral energy channel. The buildup equation is fitted to pass through the particular data point when integrated to determine a count rate attributable to thermal neutron capture gamma radiation which will be stored in each of these different data storage bins during bursts 121.

Still referring to FIG. 9, the above integration of the buildup equation is solved for the counts passed through spectral channel 77 during burst 121 using an exponential equation for the rate of buildup, and data point 143 to determine data point 161, which represents effective rate $T_E$ for the thermal neutron capture component of the total gamma ray counts accumulated in the combination of bins 1 and 2. The buildup equation is integrated for the other spectral channels, using data points 147, 151, 155, and 159, to determine data points 161, 163, 165, 167 and 169, respectively, which represent the count rates attributable to thermal neutron capture events which would pass through the different spectral channels and be stored in the data storage bins I1, I2, I3 and I4, respectively, during burst 121, at effective rate time $T_E$.

Then, the rates for the thermal neutron capture component of the total gamma radiation spectral emissions detected during neutron burst 121 can be stripped out of the rates for the total gamma radiation detected for the combination of data storage bins 1 and 2, data storage bin I1, data storage bin I2, data storage bin I3, and data storage bin I4. These rates are stripped out from the total count rates for each bin by deducting the count rates represented by data points 161, 163, 165, 167, and 169 from the data points 171, 173, 175, 177, and 179, which represent the total count rates detected in data storage bins I1, I2, I3, and I4, respectively, occurring at effective rate time $T_E$.

Thus, the inelastic component for spectral channel 77 is determined by subtracting the count rate of data point 161, which is attributable to thermal neutron capture events, from the count rate of data point 171, representing the total number of counts accumulated in data storage bins 1 and 2, to determine the inelastic component for spectral channel 77. This procedure is followed to determine the inelastic components for channels 79, 81, 83, and 85 by subtracting count rates represented by data points 163, 165, 167, and 169 from count rates represented by data points 173, 175, 177, and 179, respectively, at effective rate time $T_E$. The inelastic rates can then be processed to determine the ratios from which various formation parameters may be determined.

Figure 10:
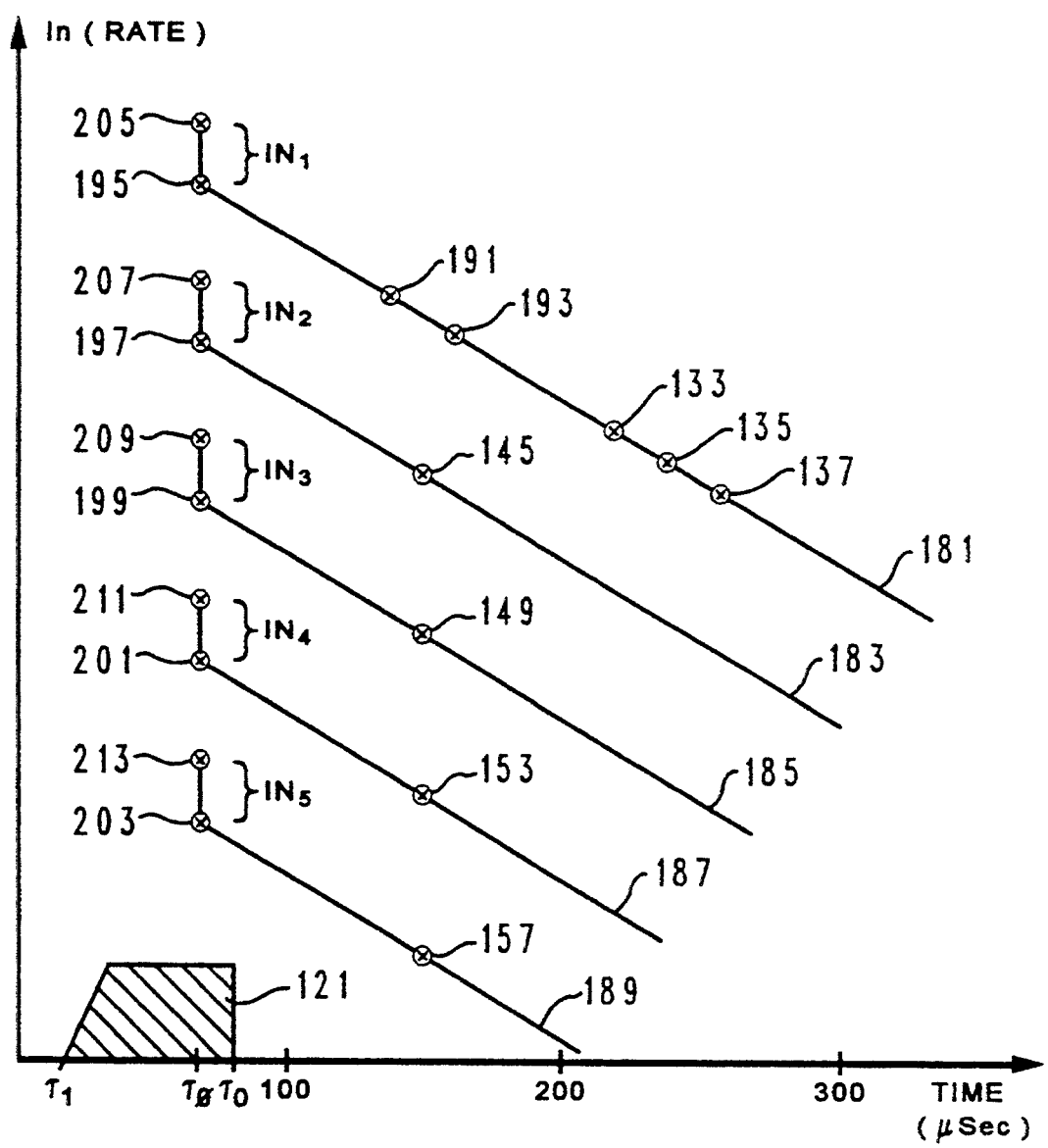
FIG. 10 is a synchronization diagram which graphically depicts an alternative method of the present invention for processing a data sample collected during the spectroscopy logging mode and determining the inelastic component of the energy spectrum detected during the burst periods.

Referring now to FIG. 10, a synchronization diagram graphically depicts an alternative method of the present invention for processing a data sample measured during the spectroscopy logging mode with well logging tool 19. The synchronization diagram schematically displays the rate of buildup and decay of spectral emissions for gamma radiation emitted during a spectroscopy logging mode period, over which the data sample is collected, in relation to the timing of the various firing cycle burst and decay periods of the spectrum logging mode period. As mentioned above, an actual data sample for the spectroscopy logging mode would be collected by detecting and storing count rates over approximately 500 firing cycles to determine a statistically acceptable data sample.

Similar to FIG. 9 above, the natural logarithms of the count rates, which are determined from counts collected in various data storage bins, are plotted according to effective rate times, in microseconds, for counts collected in the various bins within the spectroscopy logging mode firing cycle of FIG. 5. The portion of the synchronization diagram which corresponds to the burst periods is depicted by neutron burst 121. A decay equation representing an exponential decay of count rates during the decay periods is fitted to the data sample.

In this alternative embodiment of the present invention, the equation chosen for representing an exponential decay of count rates provides a linear plot when the natural logarithms of count rates are plotted against time. The decay equation is fitted to the data similar to the decay equation for FIG. 9, except that rather than projecting the equation to time $T_0$ at the end of burst 121, the decay equation is projected to time $T_\phi$ which is an arbitrarily chosen to occur 10 microseconds ($\mu$sec) before time $T_0$, which is at the end of burst 121.

Count rates are determined from each of the various data storage bins for counts occurring during the decay periods by dividing the total number of counts for each bin by the duration, or length of time, for which gamma ray counts are collected within the bin. An effective rate time is assigned to the count rate for counts stored in each bin during the decay periods of a data sample. As in the preferred method of FIG. 9, the count rates for counts occurring during the decay periods are assigned to occur at the median point of the total number of counts for each bin, that is, at a time at which half of the total counts for each bin have occurred. The rate times for the count rates for counts occurring during the decay periods are determined using the decay equation for an exponential decay of count rates over time, and the actual decay rate, or tau ($\tau$), determined from a previous data sample.

Still referring to FIG. 10, rate curves 181, 183, 185, 187, and 189 represent the count rate of thermal neutron capture gamma radiation emissions occurring for spectral energy channels 77, 79, 81, 83 and 85, respectively. Similar to curve 123 discussed in reference to FIG. 9 above, curve 181 in FIG. 10 is determined using data points 191, 193, 133, 135, and 137 which represent data storage bins 3, 4, 5, 6 and 7, respectively. The slope of curve 181 is then used in conjunction with data points 145, 149, 153, and 157 to determine rate curves 183, 185, 187, and 189, respectively. These rate curves are projected through points 145, 149, 153, 157 for each of the different spectral channels, using the slope of rate curve 181, to determine data points 195, 197, 199, 201 and 203, respectively, which are arbitrarily assigned an effective rate time $T_\phi$ occurring 10 microseconds before time $T_0$.

Data points 195, 197, 199, 201 and 203 of FIG. 10 differ from data points 143, 147, 151, 155, and 159 of FIG. 9. Data points 195, 197, 199, 201 and 203 of FIG. 10 represent the rate of gamma radiation emitted in response to thermal neutron capture, for each spectral energy channel, and are assigned effective rate times $T_\phi$ of 10 microseconds before the end of burst 121, which occurs at $T_0$. Data points 143, 147, 151, 155, and 159 of FIG. 9 represent the rates of gamma radiation emitted in response to thermal neutron capture, for each spectral energy channel, which occur at time $T_0$ at the end of burst 121, and not at $T_\phi$ which occurs at 10 microseconds before the end of burst 121.

In the alternative method of FIG. 10, time $T_\phi$ of 10 microseconds prior to the end of the burst was arbitrarily chosen as the effective rate time for the count rates measured in data storage bins 1 and 2, I1, I2, I3, and I4. This effective rate time for $T_\phi$ was arbitrarily chosen to correspond with typical values for the effective rate times for the bins occurring during the bursts.

It should be noted that assignment of an effective rate time for the counts measured in a particular bin, over a particular time interval, depends on the shape of either the decay curve or buildup curve, depending upon which part of the firing cycle the bin is located. With an exponential buildup curve, the effective rate time for a 40 microsecond data storage bin during the burst would be between the end of the bin and the midpoint in time of the bin. The arbitrary assignment of an effective rate time $T_\phi$ of 10 microseconds prior to $T_0$ in this alternative method of the present invention merely reflects that this rate time occurs in the middle portion of the last half of the data storage bins occurring during the neutron bursts.

Data points 205, 207, 209, 211, and 213 represent the count rates for data storage bins 1 and 2, I1, I2, I3, and I4, which are plotted as having effective rate time $T_\phi$ of 10 microseconds before $T_0$, at the end of burst 121, as discussed above. The average count rates for bins 1 and 2, I1, I2, I3, and I4 are determined by dividing the total number of counts accumulated in these bins by the total time in a data sample for accumulating count in the bins.

Data points 195, 197, 199, 201, and 203 represent the capture component of the total energy spectrum, expressed in count rates, and measured during burst 121. As discussed above, they are determined by projecting curves 181, 183, 185, 187, and 189 from the decay period to effective rate time $T_\phi$ occurring 10 microsecond before $T_0$ is at the end of burst 121, and which corresponds to effective rate time $T_\phi$ for count rates from data storage bins 1 and I1, I2, I3, and I4. The count rate represented by data points 195, 197, 199, 201, and 203 are directly subtracted from the count rates represented by data points 205, 207, 209, 211, and 213, respectively, to determine the count rates for the inelastic capture component of the total counts detected in spectral energy channels 77, 79, and 85, respectively.

Once the inelastic count rates are determined for the different spectral energy channels, ratios between these different count rates may be taken. These ratios for the inelastic count rates for the different spectral energy channels may be further processed to determine formation parameters, such as hydrocarbon saturation and lithology for a well depth interval over which they were recorded.

It should additionally be noted that in addition to the preferred model of FIG. 9, and the alternative model of FIG. 10, the present invention includes other hybrid models. For example, a different model could be used for the instantaneous shape of the capture time signature, such as a buildup model based on the thermal neutron lifetime (tau), and the epithermal neutron lifetime (tau$_e$). These alternative models would probably effect rate time positions and introduce small offsets to count rates; however, such variations in selection of the model should not appreciably affect the end results.

Figure 11:
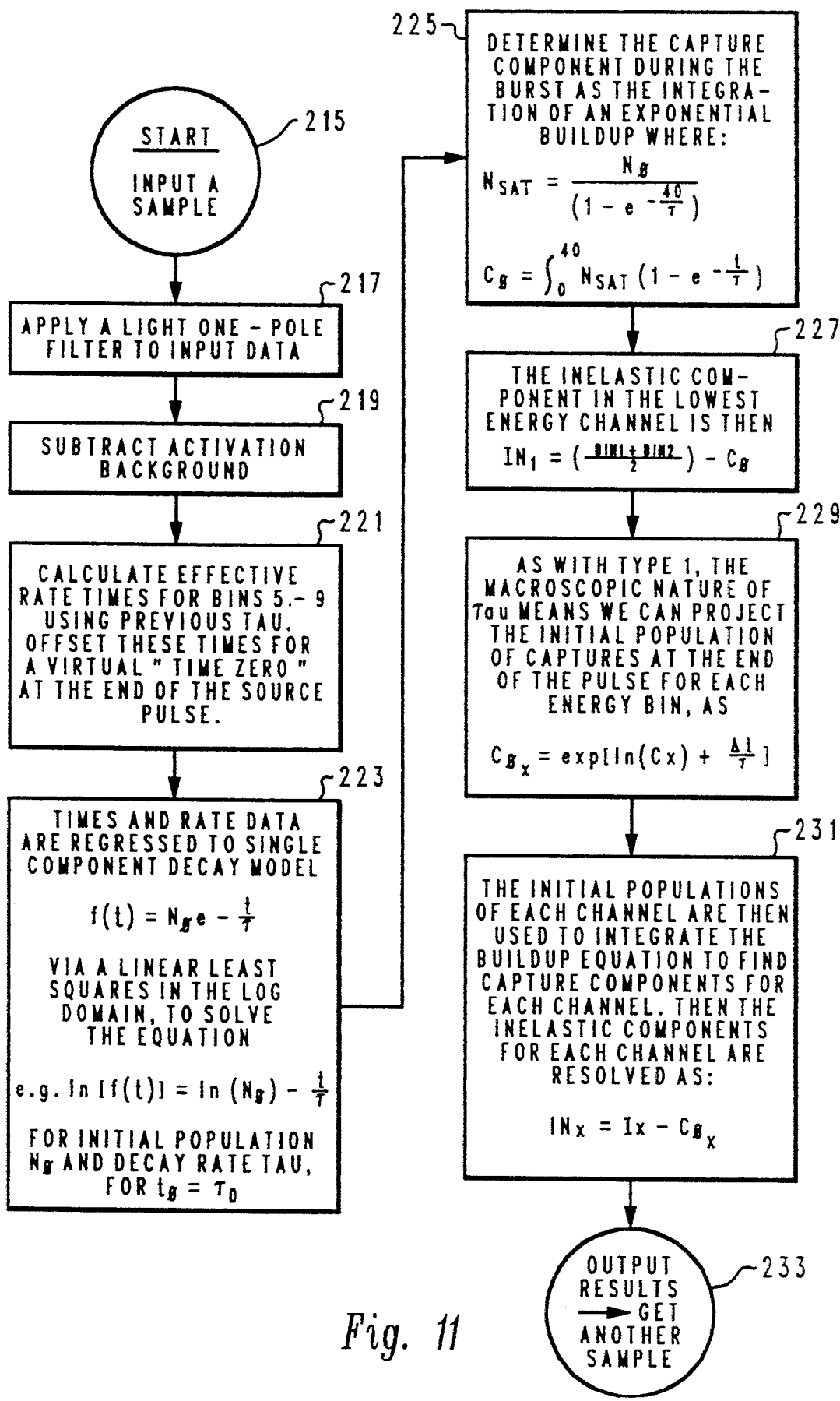
FIG. 11 is a block diagram depicting application of the preferred method of FIG. 9 for processing a data sample recorded during the spectroscopy logging mode with the well logging tool of the present invention.

Referring now to FIG. 11, a block diagram depicts operation of well logging tool 19 of the preferred embodiment for processing a data sample, collected during the spectroscopy logging mode, according to the preferred method of processing depicted in FIG. 9. In block 215 a data sample is input for processing. In block 217, a light one-pole filter is applied to the input data. In block 219, the activation background is subtracted from the data sample using the counts in bin 12 to determine the level of background activation radiation.

In block 221, the effective rate times are determined for the counts collected in data storage bins 5 through 9, using the previous value of tau ($\tau$) from the prior spectroscopy logging mode data sample. The effective rate times for bins 5 through 9 are calculated using an effective rate time equation:

$$X = \frac{-\ln(0.5(\exp(-aD) + \exp(-bD)))}{D}$$

where a=bin start time, b=bin end time, $D=1/\tau$, and x=average rate time in bin. The effective rate times of the various bins are offset for a virtual time 0 at the end of the source pulse. The effective rate times are determined by assuming that the point is median to the population of counts occurring and sequenced into a particular bin.

The number of counts for a time interval can be represented by the integral of the rate decay function, or decay equation, over that time interval. If half of the counts occur between the start of the time interval and the average rate time, then, if $D=1/\tau$, the following equation is solved to produce the above equation for determining the effective rate times for the different data storage Dins in a particular data sample:

$$1/2 = \frac{\int_a^x (N)\exp(-tD)dt}{\int_a^b (N)\exp(-tD)dt}$$

In block 223, the time and rate data are regressed to a single component decay model using the equation:

$$f(t) = N_\phi e^{-\frac{t}{\tau}}$$

and applying a linear least squares method in the log domain. This results in the following equation:

$$\ln[f(t)] = \ln(N_\phi) - \frac{t}{\tau}$$

This equation is solved to determine an actual tau ($\tau$) and $N_\phi$ for the data sample, with $N_\phi$ assigned to occur at time $T_0$.

Then, in block 225, the capture component during the neutron burst is determined by taking an integral of the exponential buildup modeled by the buildup equation:

$$N(t) = N_{SAT}\left(1 - e^{-\frac{t}{\tau}}\right)$$

where $N_{SAT}$ is the "equilibrium" or "saturation" population (flux) for a steady state source of radiation. Then using $N_\phi$ as the intercept with the decay period, $N_{SAT}$ can be solved as:

$$N_{SAT} = \frac{N_\phi}{\left(1 - e^{-\frac{40}{\tau}}\right)}$$

which is solved to determine the count rate for the capture component ($C_\phi$), and, substituting 40 microseconds for the active firing time of the pulse width during which the counts are collected in bins 1 and 2, provides the equation:

$$C_\phi = \int_0^{40} N_{SAT}\left(1 - e^{-\frac{t}{\tau}}\right)$$

The limits of 40 microseconds were chosen as the limits for this integration since, although the source is activated for 70 microseconds, there is a 30 microsecond strike time before neutrons actually begin to be emitted, and thus an active pulse width, or actual burst duration, of 40 microseconds.

In block 227, the rate for the inelastic component of first energy channel 77 ($IN_1$) is then determined using the equation:

$$IN_1 = \left(\frac{BIN1 + BIN2}{2}\right) - C_{\phi 1}$$

where BIN1 and BIN2 are defined in FIG. 5, and $C_\phi$ is defined above.

In block 229, the initial capture count rates for neutron capture events for the other spectral channels ($C_{\phi x}$), which are determined by the initial population of thermal neutrons, occurring at the end of the neutron burst are projected for energy channels 79, 81, 83, and 85 utilizing the rate of decay, tau ($\tau$), determined for energy channel 77, and the equation:

$$C_{\phi Ix} = \exp\left[\ln(C_x) + \frac{\Delta t}{\tau}\right]$$

where $\Delta t$ is equal to the effective rate time for the particular bin ($C_x$) minus $T_\phi$.

In block 231, the initial rates determined for the initial neutron populations for each of the spectral energy channels are used to integrate the buildup equation to find the capture components for each channel. Then, the inelastic components for each energy channel are resolved using the equation:

$$IN_x = I_x - C_{\phi x}$$

In block 233, the results are output and the uphole processor goes to another data sample for processing.

Figure 12:
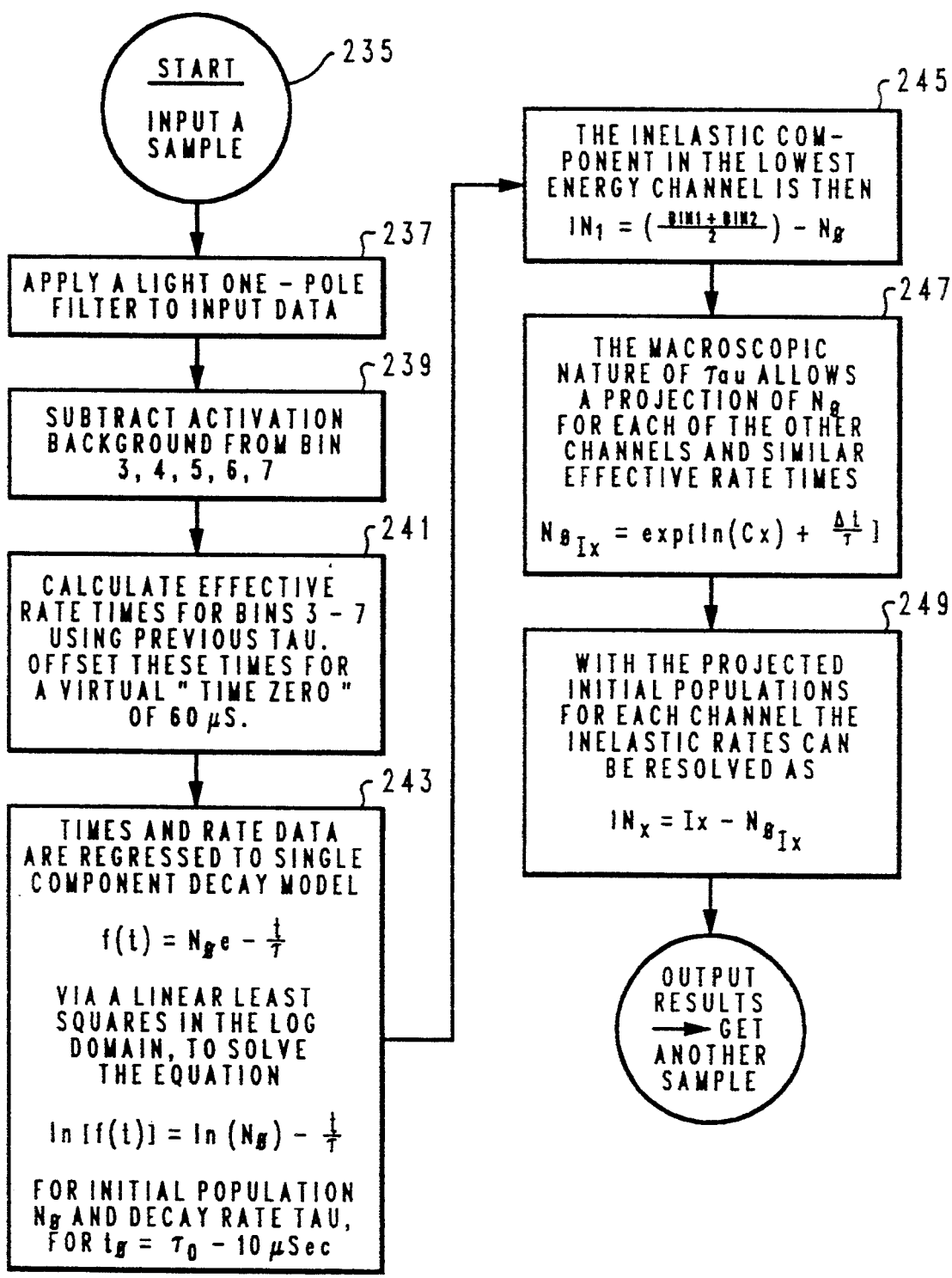
FIG. 12 is a block diagram depicting application of the alternative method of FIG. 10 for processing a data sample recorded during the spectroscopy logging mode with a well logging tool of the alternative embodiment of the present invention.

With reference to FIG. 12, a block diagram depicts operation of well logging tool 19 to process a data sample according to the alternative method of FIG. 10 during the spectroscopy logging mode. FIG. 12 depicts application of the alternative method of projecting rates for thermal neutron capture events during the bursts directly to a point in time occurring within the bursts. In block 235 a data sample is input for processing. In block 237, a light one-pole filter is applied to the input data. Block 239 depicts the activation background being subtracted from the data sample using the counts in bin 12 to determine the level of background activation radiation for a data sample.

In block 241, the count rates are determined for the different time intervals over which bins 3 through 7 are collected using the previous value of tau ($\tau$) from a the prior spectroscopy logging mode data sample, similar to block 221 of FIG. 11. The effective rate times for bins 3 through 7 are calculated using the effective rate time equation described above for block 221.

In block 243, the time and rate data are regressed to a single component decay model described for block 223 above, and a linear least squares method is applied in the log domain using the equation:

$$\ln[f(t)] = \ln(N_\phi) - \frac{t}{\tau}$$

This equation is solved to determine an actual tau ($\tau$) and count rates $N_\phi$ for each spectral energy channel for the data sample. Rates for the capture component of counts collected during the neutron bursts are projected to rate time $T_\phi$ within the burst periods for the data sample, and which occurs 10 microseconds prior $T_0$, which occurs at the end of the bursts. Thus $N_\phi$ solved for in block 243 is used for the rate of capture for spectral channel 77, which occurs at time $T_\phi$, 10 microseconds prior to the end of the bursts, rather than using an equation for an exponential buildup during the neutron bursts, as was discussed above in reference to blocks 225 and 227 of FIG. 11.

In block 245, the rate for the inelastic component for energy channel 77 is then determined using the equation:

$$\text{INELASTIC} = \left(\frac{BIN1 + BIN2}{2}\right) - N_\phi$$

Then, in block 247, the count rates corresponding to initial neutron populations, and thus initial thermal neutron capture events at the beginning of the neutron bursts, are projected for each energy level utilizing the actual tau ($\tau$) calculated in block 243, and the equation:

$$N_{\phi Ix} = \exp\left[\ln(C_x) + \frac{\Delta t}{\tau}\right]$$

where $\Delta t$ is equal to the effective rate time for the particular bin ($C_x$) minus $T_\phi$.

In block 249, the count rates for the inelastic component of each energy channel are resolved using the equation:

$$IN_x = I_x - N_{\phi IX}$$

Then, as indicated in block 251, the results are output and the uphole processor goes to another data sample for processing.

It should be noted, that in alternative embodiments of the present invention, an actual tau ($\tau$) could be calculated for each spectral energy channel of a data sample, rather than using the actual tau ($\tau$) for spectral energy channel 77. In such an alternative embodiment of the present invention, energy counts could be sequenced into additional data storage bins during the decay period. These additional storage bins would be similar to bins 3 through 12, as depicted in FIG. 5 for spectral energy channel 77, to determine a rate of decay for each spectral energy channel. However, in the preferred embodiment, the rate of decay is presumed to be the same for each channel, since the rate of decay at any moment is presumed to be representative of the thermal neutron population at that moment, as discussed above.

The well logging tool of the preferred embodiment of the present invention offers several advantages over prior art well logging tools. The advantages include improvements in statistical resolution, which provide greater tool accuracy and better tool operating efficiency, which are discussed in the following.

One advantage of the present invention over the prior art is that an actual gamma ray decay rate is measured and then used for determining a burst thermal neutron capture energy spectrum for a data sample. The gamma ray decay rate is measured by collecting counts in more than two data storage bins, and is represented by an exponential curve which is fitted to the counts from the more than two data storage bins. Thus, a burst thermal neutron capture energy spectrum can be more accurately determined, with an improved statistical resolution, for subtracting from a burst total gamma ray energy spectrum to determine an inelastic energy spectrum for a data sample.

Another advantage is that the well logging tool of the present invention determines a burst thermal neutron capture energy spectra by projecting a measured exponential decay rate curve from thermal neutron capture gamma ray energy spectra detected in decay periods following the neutron bursts. Inelastic energy spectra are then determined by subtracting the burst thermal neutron capture energy spectra from a total gamma ray energy spectra detected during the neutron bursts. An exponential decay rate curve is determined for the capture spectral energy. The values determined for the inelastic energy spectra are more accurate than if the burst thermal neutron capture energy spectra were estimated by linear approximation from a total number of counts sequenced into data storage bins during tool operating cycle decay periods.

Another advantage of the well logging tool of the present invention is that it can be operated in a spectroscopy logging mode which includes a longer inelastic firing cycle for further improving statistical resolution to provide more accurate data samples. The inelastic firing cycle has both a longer burst period and a longer decay period for allowing a broader formation response time. The longer decay period extends for several thermal neutron lifetimes which allows a longer period of time for the formation to capture thermal neutrons and emit capture gamma radiation for more accurately determining the decay rate in the spectroscopy logging mode. The longer burst period allows more time for inelastic collisions to occur, and thus improves the statistical resolution, or accuracy, of collected data samples.

Yet another advantage is that the well logging tool of the present invention provides improvements in operating efficiency since the better statistical resolution allows both inelastic energy spectra and thermal neutron capture cross sections to be measured in a single logging pass, with acceptable accuracies. The present invention may be operated in a dual logging mode in which the tool automatically alternates between inelastic firing cycles in a spectroscopy logging mode and capture firing cycles in a sigma logging mode during the same logging pass through a well depth interval.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A well logging tool for determining a plurality of formation parameters by emitting a series of neutron bursts into a borehole to induce gamma radiation having inelastic energy spectra from which said plurality of formation parameters may be determined, said well logging tool comprising:

means for emitting a series of neutron bursts into a formation adjacent to a borehole to cause said formation to emit induced gamma radiation;

means for controlling operation of said well logging tool over a plurality of tool firing cycles, each of said plurality of tool firing cycles including a burst period and a decay period, said burst period defined to occur when each of said neutron bursts is emitted, and said decay period defined to occur following said burst period;

means for detecting said induced gamma radiation and measuring, for said induced gamma radiation, a total gamma ray energy spectrum detected during a plurality of said burst periods, a thermal neutron capture gamma ray energy spectrum detected during a plurality of said decay periods, and gamma ray energy decay rate detected during at least a portion of said decay periods; and means for processing said total gamma ray energy spectrum, said thermal neutron capture gamma ray energy spectrum, and said gamma ray energy decay rate to determine an inelastic energy spectrum by removing from said total gamma ray energy spectrum a burst thermal neutron capture energy spectrum, wherein said burst thermal neutron capture energy spectrum is determined by fitting at least one exponential decay rate curve to said gamma ray energy decay rate and projecting said at least one exponential decay rate curve to extend from said thermal neutron capture gamma ray energy spectrum to at least a portion of said plurality of said burst periods.

2. The well logging tool of claim 1, wherein said means for processing comprises:

a surface computer; and downhole hardware for counting and storing output data from said means for detecting, said downhole hardware including a plurality of data storage bins.

3. The well logging tool of claim 1, wherein rates for said burst thermal neutron capture energy spectrum are directly projected to an effective rate time occurring within said plurality of said burst periods.

4. The well logging tool of claim 1, wherein said burst thermal neutron capture energy spectrum is defined to build up at an exponential rate during each of said plurality of said burst periods.

5. The well logging tool of claim 1, wherein said gamma ray energy decay rate is determined from a singular spectral energy channel during said plurality of said decay periods.

6. The well logging tool of claim 1, wherein said gamma ray energy decay rate is separately measured for each of a plurality of spectral energy channels during at least a portion of said plurality of said decay periods, and a plurality of exponential decay rate curves is determined for each of said gamma ray energy decay rates for separately projecting said thermal neutron capture gamma ray energy spectrum for separately determining said burst thermal neutron capture energy spectrum for each of said plurality of spectral energy channels.

7. The well logging tool of claim 1, wherein said total gamma ray energy spectrum and said thermal neutron capture gamma ray energy spectrum are measured by sorting detected counts of said induced gamma radiation into at least three different spectral energy channels.

8. The well logging tool of claim 1, wherein said decay period for each of said plurality of tool firing cycles substantially extends for at least 500 microseconds when said well logging tool is operated for determining said inelastic energy spectra.

9. The well logging tool of claim 1, wherein said means for controlling operates said well logging tool over a tool operating cycle which includes two separate logging modes, a sigma logging mode and a spectroscopy logging mode;

wherein said means for controlling automatically alternates said well logging tool between said sigma logging mode and said spectroscopy logging mode at least once for each incremental depth interval during a singular logging pass over a well depth interval;

wherein said means for controlling further automatically selects neutron burst durations for each of said two logging modes, wherein said sigma logging mode has different burst duration control parameters, which determine said neutron burst durations, than said spectroscopy logging mode;

wherein said means for detecting collects a plurality of data samples which includes both at least one inelastic energy spectrum data sample and at least one thermal neutron capture decay rate data sample for said each incremental depth interval during a singular logging pass over said well depth interval; and wherein said means for processing processes said plurality of data samples to determine an inelastic energy spectrum and a thermal neutron capture decay rate for said each incremental depth interval to provide, from said singular logging pass, a continuous well log over said well depth interval.

10. A well logging tool for determining a plurality of formation parameters by emitting bursts of fast neutrons which interact with a plurality of formation elements about said borehole to induce gamma radiation having gamma ray energy spectra from which said plurality of formation parameters may be determined, said well logging tool comprising:

a housing;

a power supply;

an actuatable source for emitting bursts of fast neutrons into a formation and thereby inducing a plurality of formation elements to emit induced gamma radiation having a plurality of energy levels;

at least one detector for receiving said induced gamma radiation and emitting a plurality of output data signals which indicate said plurality of energy levels of said induced gamma radiation;

at least one discriminator for sorting said plurality of output data signals into a plurality of spectral energy channels according to said plurality of energy levels of said induced gamma radiation;

a plurality of data storage bins for receiving said plurality of output data signals from said plurality of spectral energy channels and storing said plurality of output data signals as a plurality of counts within said plurality of data storage bins over a plurality of data storage time intervals;

a tool controller for determining a tool operating cycle having a plurality of time periods, said plurality of time periods including a plurality of burst periods in which said source is actuated to an active mode for emitting said pulses of fast neutrons, a plurality of decay periods in which said source is in an inactive mode, and said plurality of data storage time intervals for determining within which of said plurality of data storage bins said plurality of counts are stored; and a data processor for processing said plurality of counts from said plurality of data storage bins to determine an inelastic energy spectrum for a tool operating cycle by first, determining a total gamma ray energy spectrum from at least a burst portion of said plurality of counts stored in said plurality of bins during said plurality of burst periods, and second, subtracting a burst thermal neutron capture energy spectrum from said total gamma ray energy spectrum, wherein said burst thermal neutron capture energy spectrum is determined by fitting at least one exponential decay rate curve to a decay portion of said plurality of counts which are stored in said plurality of data storage bins during said plurality of decay periods, and projecting said at least one exponential decay rate curve from a thermal neutron capture gamma ray energy spectrum determined from said decay portion of said plurality of counts.

11. The well logging tool of claim 10, wherein rates for said burst thermal neutron capture energy spectrum are directly projected to an effective rate time occurring within said plurality of said burst periods.

12. The well logging tool of claim 10, wherein said plurality of spectral energy channels include at least three spectral energy channels for passing at least three separate ranges of energy levels of said induced gamma radiation.

13. The well logging tool of claim 10, wherein said burst thermal neutron capture energy spectrum is defined to build up at an exponential rate during each of said plurality of burst periods.

14. The well logging tool of claim 13, wherein said plurality of spectral energy channels include at least three spectral energy channels for passing at least three different ranges of energy levels for said induced gamma radiation.

15. The well logging tool of claim 10, wherein each of said plurality of burst periods substantially extends for actual burst durations of at least 40 microseconds during a portion of said tool operating cycle for determining said inelastic energy spectrum.

16. The well logging tool of claim 10, wherein each of said plurality of decay periods substantially extends for at least 500 microseconds during a portion of said tool operating cycle for determining said inelastic energy spectrum.

17. The well logging tool of claim 10, wherein said tool operating cycle includes two different logging modes, a sigma logging mode and a spectroscopy logging mode;

wherein said tool controller automatically alternates between said sigma logging mode and said spectroscopy logging mode at least once for each incremental depth interval during a singular logging pass over a well depth interval;

wherein said tool controller automatically selects neutron burst durations for each of said two logging modes, wherein said sigma logging mode has different burst duration control parameters, which determine said neutron burst durations, than said spectroscopy logging mode;

wherein said plurality of data storage bins receive a plurality of data samples which includes both at least one inelastic energy spectrum data sample and at least one thermal neutron capture decay rate data sample for said each incremental depth interval during said singular logging pass over said well depth interval; and wherein said processor processes said plurality of data samples to determine an inelastic energy spectrum and a thermal neutron capture decay rate for said each incremental depth interval to provide, from said singular logging pass, a continuous well log over said well depth interval.

18. A well logging tool for determining a plurality of formation parameters by emitting bursts of fast neutrons which interact with a plurality of formation elements about said borehole to induce gamma radiation having gamma ray energy spectra from which said plurality of formation parameters may be determined, said well logging tool comprising:

a housing;

a power supply;

an actuatable source for emitting bursts of fast neutrons into a formation and thereby inducing a plurality of formation elements to emit induced gamma radiation having a plurality of energy levels;

at least one detector for receiving said induced gamma radiation and emitting a plurality of output data signals which indicate said plurality of energy levels of said induced gamma radiation;

at least one discriminator means for sorting said plurality of output data signals into a plurality of spectral energy channels according to said plurality of energy levels of said induced gamma radiation;

a plurality of data storage bins for receiving said plurality of output data signals from said plurality of spectral energy channels and storing said plurality of output data signals as a plurality of counts within said plurality of data storage bins over a plurality of data storage time intervals;

a tool controller for determining a tool operating cycle having two different operating modes, a capture logging mode and an inelastic logging mode, which each include a plurality of time periods, said plurality of time periods including a plurality of burst periods in which said source is actuated to an active mode for emitting said pulses of fast neutrons, a plurality of decay periods in which said source is in an inactive mode, and said plurality of data storage time intervals for determining within which of said plurality of data storage bins said plurality of counts are stored; and wherein said tool controller automatically alternates between said sigma logging mode and said spectroscopy logging mode at least once for each incremental depth interval during a singular logging pass over a well depth interval;

wherein said tool controller automatically selects neutron burst durations for each of said two logging modes, wherein said sigma logging mode has different burst duration control parameters, which determine said neutron burst durations, than said spectroscopy logging mode;

wherein said plurality of data storage bins receives a plurality of data samples which includes both at least one inelastic energy spectrum data sample and at least one thermal neutron capture decay rate data sample for said each incremental depth interval during said singular logging pass over said well depth interval; and a data processor for processing said plurality of data samples which include said plurality of counts from said plurality of data storage bins to determine, for each incremental depth interval, an inelastic energy spectrum, and a thermal neutron capture decay rate; and providing a continuous well log over said well depth interval by, in part, graphically displaying said inelastic energy spectrum and said thermal neutron capture decay rate for said each incremental depth interval from said data samples collected during said singular logging pass.

19. The apparatus for logging a well of claim 18, wherein said total gamma ray energy spectrum and said thermal neutron capture gamma ray energy spectrum are measured by sorting said plurality of counts for said induced gamma radiation into at least three distinct spectral energy channels.

20. The apparatus for logging a well of claim 18, wherein a burst duration substantially extending for actual burst durations of at least 40 microseconds is automatically selected during said spectroscopy logging mode.

21. The apparatus for logging a well of claim 20, wherein, during said spectroscopy logging mode, a decay period substantially extends for at least 500 microseconds following each of said neutron bursts which occur during said spectroscopy logging mode.

22. A method for logging a well to determine a plurality of formation parameters by emitting a series of neutron bursts to induce gamma radiation having inelastic energy spectra from which said plurality of formation parameters may be determined, said method for logging comprising the steps of:

emitting a series of neutron bursts into a formation to induce gamma radiation;

detecting said induced gamma radiation and emitting output data signals which indicate energy spectra for said induced gamma radiation, said energy spectra for a tool operating cycle including a total gamma ray energy spectrum detected during said neutron bursts, and a thermal neutron capture gamma ray energy spectrum and a gamma ray energy decay rate which are both detected during a plurality of decay periods which separately follow said neutron bursts;

processing said output data signals for determining an inelastic energy spectrum for said tool operating cycle by taking said total gamma ray energy spectrum and subtracting a burst thermal neutron capture energy spectrum which is determined by projecting from said thermal neutron capture energy spectrum at least one exponential decay rate curve determined from said gamma ray energy decay rate; and further processing said output data signals to determine said plurality of formation parameters from, at least in part, said inelastic energy spectra.

23. The method for logging a well of claim 22, wherein rates for said burst thermal neutron capture energy spectrum are directly projected to an effective rate time occurring within said neutron bursts.

24. The method for logging a well of claim 22, wherein said burst thermal neutron capture energy spectrum is defined to build up at an exponential rate during said neutron bursts.

25. The method for logging a well of claim 22, wherein said total gamma ray energy spectrum and said thermal neutron capture gamma ray energy spectrum are measured by sorting counts for said induced gamma radiation into at least three different spectral energy channels.

26. The method for logging a well of claim 22, wherein each of said plurality of decay periods substantially extends for at least 500 microseconds after a corresponding one of said neutron bursts for determining said inelastic energy spectrum.

27. The method for logging a well of claim 22, wherein said tool operating cycle includes two different logging modes, a sigma logging mode and a spectroscopy logging mode, and said method of logging a well further comprises the steps of:

automatically alternating between said sigma logging mode and said spectroscopy logging mode at least once for each incremental depth interval during a singular logging pass over a well depth interval;

automatically selecting neutron burst durations for each of said two logging modes, wherein said sigma logging mode has different burst duration control parameters, which determine said neutron burst durations, than said spectroscopy logging mode;

collecting a plurality of data samples which includes both at least one inelastic energy spectrum data sample and at least one thermal neutron capture decay rate data sample for said each incremental depth interval during said singular logging pass over said well depth interval; and processing said plurality of data samples to determine an inelastic energy spectrum and a thermal neutron capture decay rate for said each incremental depth interval to provide, from said singular logging pass, a continuous well log over said well depth interval.

28. A method for logging a well to determine a plurality of formation parameters by emitting a series of neutron bursts and detecting induced gamma radiation having inelastic energy spectra and thermal neutron capture decay rates from which said plurality of formation parameters may be determined, said method for logging a well comprising the steps of:

operating in both a sigma logging mode and a spectroscopy logging mode during a singular logging pass over a well depth interval for collecting a plurality of data samples which includes both at least one inelastic energy spectrum data sample and at least one thermal neutron capture decay rate data sample for each incremental depth interval during said singular logging pass over said well depth interval;

emitting neutron bursts during both said sigma logging mode and said spectroscopy logging mode for said each incremental depth interval during said singular logging pass over said well depth interval;

collecting said plurality of data samples by detecting and measuring energy levels for induced gamma radiation induced by said neutron bursts;

processing said plurality of data samples to determine, for said each incremental depth interval, an inelastic energy spectrum, and a thermal neutron capture decay rate; and providing a continuous well log over said well depth interval by, at least in part, graphically displaying said inelastic energy spectrum and said thermal neutron capture decay rate for said each incremental depth interval from said data samples collected during said singular logging pass.

29. The method for logging a well of claim 28, wherein said total gamma ray energy spectrum and said thermal neutron capture gamma ray energy spectrum are measured by sorting counts for said induced gamma radiation into at least three distinct spectral energy channels.

30. The method for logging a well of claim 28, further comprising the step of:
automatically selecting neutron burst durations for timing said neutron bursts in said sigma logging mode and said spectroscopy logging mode, wherein said sigma logging mode has different burst duration control parameters, which determine each of said neutron burst durations, than said spectroscopy logging mode.

31. The method for logging a well of claim 30, wherein a burst duration actually extending for substantially 40 microseconds is automatically selected during said spectroscopy logging mode.

32. The method for logging a well of claim 30, wherein, during said spectroscopy logging mode, a decay period substantially extends for at least 500 microseconds following each of said neutron bursts which occur during said spectroscopy logging mode.

* * * * *